UNITED STATES PATENT OFFICE.

HENRY J. HALBERT AND FRANCIS KING, OF BALTIMORE, MARYLAND.

IMPROVEMENT IN PACKING MATERIALS.

Specification forming part of Letters Patent No. 161,224, dated March 23, 1875; application filed June 1, 1874.

*To all whom it may concern:*

Be it known that we, HENRY J. HALBERT and FRANCIS KING, of the city of Baltimore and State of Maryland, have invented a certain new Packing for General Purposes, of which the following is a specification; and we do hereby declare that the following is a full, clear, and exact description thereof.

Our invention relates to a new material for a packing for joints in steam, water, gas, and other fitting; also for seats for cocks, for gaskets, washers, and all and any purposes wherein a tight steam, water, or other fluid joint is to be formed.

The crude material referred to is the hoofs of animals, the preparation thereof for the purpose of a packing consisting simply in the boiling, steaming, or chemical treatment of the same, with a view to removing whatever greasy, fatty, or oily substance is found therein. Heretofore, in general, gum, leather, wood, lead, glass, &c., have been used for the purposes designated, and the objections which have been urged against the first three substances have been based chiefly on their rapid depreciation in value and efficiency by the action of the heat, pressure, or other conditions to which they are necessarily subjected. Against lead and glass, objections equally well founded have been and are urged.

In seeking to find a material which should possess elements enabling it to withstand the varying conditions to which a general packing is exposed, we have found that the hoofs of animals, when prepared in the simple manner set forth, embody the several advantages found in the several other materials named as being now in use for ordinary and general packing purposes. The hoof being, as is known, neither a bone nor a hide, but a sort of gristly substance, it is, in a measure, flexible as are hide and gum, springy as wood, compressible, solid, and compact as lead, but with the advantage of elasticity, and almost non-frictional as glass, without its frangibility.

The prepared hoof is easily worked, can be pared with an ordinary knife, stamped, or readily split, turned, or planed.

It will, of course, be understood that this material can be applied only to such uses wherein the size of the packing is within the dimensions of the hoof.

Having described our invention, what we claim as new, and wish to secure by Letters Patent of the United States, is—

As a packing for general purposes, the material herein described, consisting of the hoofs of animals treated by removing all fatty or oily substance, and cut or shaped to the desired size or form, substantially as set forth.

In testimony whereof we have hereto subscribed our names in the city of Washington, District of Columbia, this 1st day of June, in the year of our Lord 1874.

HENRY J. HALBERT.
FRANCIS KING.

Witnesses:
GEORGE H. HOWARD,
H. A. DANIELS.